(12) United States Patent
Tanaka (10) Patent No.: US 7,559,311 B2
(45) Date of Patent: Jul. 14, 2009

(54) SOLENOID OPERATED VALVE DEVICE DESIGNED TO ENSURE HIGH RESPONSIVENESS OF VALVE ACTION

(75) Inventor: Kensuke Tanaka, Hekinan (JP)

(73) Assignee: Denso Corporation, Kariya (JP)

( * ) Notice: Subject to any disclaimer, the term of this patent is extended or adjusted under 35 U.S.C. 154(b) by 113 days.

(21) Appl. No.: 11/905,860

(22) Filed: Oct. 4, 2007

(65) Prior Publication Data

US 2008/0087254 A1    Apr. 17, 2008

(30) Foreign Application Priority Data

Oct. 6, 2006    (JP)    .............................. 2006-275056

(51) Int. Cl.
*F02M 59/36*    (2006.01)
*H01H 47/00*    (2006.01)

(52) U.S. Cl. ....................... 123/458; 361/143; 361/146; 361/154; 361/159

(58) Field of Classification Search ................. 123/457, 123/458; 361/143, 144, 146, 152, 154, 159, 361/160; 251/129.09, 129.1
See application file for complete search history.

(56) References Cited

U.S. PATENT DOCUMENTS

| | | | | |
|---|---|---|---|---|
| 4,176,387 A | * | 11/1979 | Harper | ......................... 361/154 |
| 4,180,026 A | * | 12/1979 | Schulzke et al. | ............. 123/490 |
| 4,238,813 A | * | 12/1980 | Carp et al. | .................... 361/154 |
| 4,452,210 A | * | 6/1984 | Sasayama et al. | ........... 123/490 |
| 4,922,878 A | * | 5/1990 | Shinogle et al. | .............. 123/490 |
| 5,752,308 A | * | 5/1998 | Maley et al. | ................. 29/602.1 |
| 5,954,030 A | * | 9/1999 | Sturman et al. | ............. 123/446 |
| 5,959,825 A | * | 9/1999 | Harcombe | ................... 361/154 |
| 5,986,871 A | * | 11/1999 | Forck et al. | .................. 361/160 |
| 6,036,120 A | * | 3/2000 | Varble et al. | ............. 239/585.1 |
| 6,065,684 A | * | 5/2000 | Varble et al. | .................... 239/5 |
| 6,128,175 A | * | 10/2000 | Wright et al. | ................ 361/154 |
| 6,273,067 B1 | * | 8/2001 | Bazinet | ....................... 123/458 |
| 6,332,454 B1 | * | 12/2001 | Itabashi et al. | .............. 123/490 |
| 6,367,452 B1 | * | 4/2002 | Shima et al. | ................. 123/457 |
| 6,392,865 B1 | * | 5/2002 | Fochtman et al. | ........... 361/160 |
| 6,457,457 B1 | * | 10/2002 | Harcombe | ................... 123/490 |
| 6,684,854 B2 | * | 2/2004 | Coldren et al. | .............. 123/446 |
| 6,799,559 B2 | * | 10/2004 | Mieny et al. | ................. 123/490 |
| 6,840,220 B2 | * | 1/2005 | Yomogida et al. | ........... 123/456 |
| 7,021,568 B2 | * | 4/2006 | Rieger et al. | ............. 239/585.1 |

FOREIGN PATENT DOCUMENTS

JP    2000-265920    9/2000
JP    2001-059462    3/2001

* cited by examiner

*Primary Examiner*—Thomas N Moulis
(74) *Attorney, Agent, or Firm*—Nixon & Vanderhye, PC (57) ABSTRACT

A solenoid-operated valve device is provided which includes a valve, a solenoid actuator designed to be supplied with electric power from a battery to operate on voltage substantially identical with that outputted from the battery to move the valve, and a controller working to energize said solenoid actuator. Prior to entering a main energization mode to energize the solenoid actuator to open or close the valve, the controller works to supply a low current to the solenoid actuator to create magnetic field therein to assist in energizing the solenoid actuator in the main energization mode quickly at a high speed. The controller may alternatively be designed to step-up the voltage to be applied to the solenoid actuator initially prior to entering the main energization mode.

8 Claims, 5 Drawing Sheets

○ START OF VALVE-OPENING ACTION IN THE PRESENCE OF PRE-ENERGIZATION
□ START OF VALVE-OPENING ACTION IN THE ABSENCE OF PRE-ENERGIZATION
● END OF VALVE-OPENING ACTION IN THE PRESENCE OF PRE-ENERGIZATION
■ END OF VALVE-OPENING ACTION IN THE ABSENCE OF PRE-ENERGIZATION

United States Patent US 7,559,311 B2

SOLENOID OPERATED VALVE DEVICE DESIGNED TO ENSURE HIGH RESPONSIVENESS OF VALVE ACTION

CROSS REFERENCE TO RELATED DOCUMENT

The present application claims the benefit of Japanese Patent Application No. 2006-275056 filed on Oct. 6, 2006, the disclosure of which is incorporated herein by reference.

BACKGROUND OF THE INVENTION

1. Technical Field of the Invention

The present invention relates generally to a solenoid-operated valve device designed to enhance the response speed of a solenoid actuator to move a valve, and a fuel injection system using such a valve device.

2. Background Art

Solenoid-operated valve devices are in wide-spread use which produce magnetic attraction to move a valve to open or close a fluid path. The solenoid-operated valve devices are quipped with a solenoid valve which includes an electromagnet working to attract the valve in a given direction when energized. The solenoid valve is also equipped with an elastic member such as a spring which urges the valve in a direction reverse to that in which the valve is magnetically attracted. When the electromagnet is deenergized, the valve is held in an initial position by the elastic member. This type of solenoid valve has the drawback in that when a cycle in which the valve is open or closed is shortened, the magnetism created in the coil will result in a decrease in response speed at which the valve is closed.

In order to alleviate the above program, Japanese Patent First Publication No. 2000-265920 discloses a solenoid-operated valve device which uses a valve-opening coil and a valve-closing coil to enhance the response speed at which the valve is opened and closed. Japanese Patent First Publication No. 2001-59462 also teaches controlling the valve-opening coil and the valve-closing coil to facilitate the disappearance of magnetism remaining in one of the coils.

In recent years, fuel injection systems for diesel engines such as common rail injection systems have been required to increase the pressure at which fuel is injected into the engine and enhance the accuracy in controlling a small quantity of fuel to be injected into the engine. To meet such requirements, some of the fuel injection systems employ fuel injectors which are designed to use high-pressure of fuel in assisting in moving a valve of the fuel injector or a hydraulic mechanism working to amplify a stroke of a piezoelectric device hydraulically to improve the response speed of the fuel injectors. The fuel injectors equipped with such a piezoelectric device are designed not to drain the fuel statically for spraying the fuel, which is made to use the negative pressure of fuel in moving the valve in conventional fuel injectors. This results in a difficulty in brining the pressure of fuel in the common rail into agreement with a target value, for example, when an accelerator pedal is released suddenly, so that the target value of the pressure in the common rail is decreased greatly, which may cause the pressure of fuel which is higher than the target value to be injected into the engine. When it is required to elevate the pressure of fuel to be sprayed from the fuel injectors, it may also result in an overshoot thereof, thus requiring the need for increasing the pressure resistance of component parts of the fuel injectors and resulting in the complexity of the structure thereof. When an actual pressure of the fuel in the common rail is much higher than the target value, ensuring the desired accuracy in controlling the quantity of fuel to be sprayed from the fuel injectors requires draining the fuel from the common rail quickly, thus resulting in the need for actuating a pressure control solenoid valve at high speeds which drains the fuel from the common rail. Particularly, when it is required to the time the fuel injectors should be opened accurately, it is essential to improve the response speed of the pressure control solenoid valve.

The solenoid-operated devices, as taught in the above two publications, are useful for improvement the response speed of the valve, but however, use the two coils and thus require driver circuit one for each of the coils, thus resulting in an increase in component parts and complexity of the structure thereof. Additionally, when the voltage to be applied to the solenoid-operated valve is increased in order to enhance the speed of valve action thereof, it requires, for example, large-capacity capacitors, thus resulting in an increase in component parts and complexity of the structure of the solenoid-operated valve devices.

SUMMARY OF THE INVENTION

It is therefore an object of the invention to provide a simple structure of a solenoid-operated valve device which is designed to ensure a high response speed of valve action.

According to one aspect of the invention, there is provided a solenoid-operated valve device which may be employed in, for instance, common rail fuel injection systems for automotive diesel engines to drain fuel from a common rail to reduce the pressure therein. The solenoid-operated valve device comprises: (a) a valve disposed to be movable; (b) a solenoid actuator designed to be supplied with electric power from a battery to operate on voltage substantially identical with that outputted from the battery to move the valve; and (c) a controller working to energize the solenoid actuator in a selected one of a pre-energization mode and a main energization mode. In the pre-energization mode, the controller supplies an amount of the electric power to the solenoid actuator to energize the solenoid actuator to a degree which keeps the valve from moving. In the main energization mode, the controller supplies the electric power to the solenoid actuator to energize the solenoid actuator to a degree which moves the valve. The controller enters the pre-energization mode prior to the main energization mode to enhance action of the solenoid actuator in the main energization mode.

Specifically, pre-energization of the solenoid actuator in the pre-energization mode will produce the magnetic field therein which usually remains for some period of time after termination of the pre-energization. When the remaining magnetic field fades away, the solenoid actuator usually develops a counter-electromotive force oriented to obstruct the attenuation of the magnetic field according to the Lenz's law. The direction of flow of electric current, as produced by the counter-electromotive force, is identical with that of flow of electric current through the solenoid actuator in the main energization mode to lift up the valve. Therefore, when the main energization mode is entered before the counter-electromotive force disappears fully, it will cause the current, as created by the counter-electromotive force, to serve to assist in bringing the current flowing through the solenoid actuator in the main energization mode to a value quickly which is required to move or open the valve. This results in a quick rise in the current flowing through the solenoid actuator and advance in time at which the valve starts to move in the main energization mode, thereby shortening the time until the start of movement of the valve and the time until the stroke of the valve is maximized to open or close a fluid path fully. In other words, the pre-energization of the solenoid actuator results in a decrease in time lag between the start of the main energization of the solenoid actuator and the start of movement of the valve and an increase in speed at which the valve moves in the main energization mode.

According to the second aspect of the invention, there is provided a solenoid-operated valve device which comprises: (a) a valve disposed to be movable; (b) a solenoid actuator designed to be supplied with electric power from a battery to operate on voltage substantially identical with that outputted from the battery to move the valve; and (c) a controller working to supply an amount of the electric power to the solenoid actuator to create a flow of a high current through the solenoid actuator to a degree which moves the valve in a main energization mode. The controller also works in a sub-energization mode to continue to supply an amount of the electric power to the solenoid actuator to create a flow of a low current through the solenoid actuator to a degree which keeps the valve from moving at least until initiation of the main energization mode.

Specifically, prior to entering the main energization mode, the controller supplies the low current to the solenoid actuator, so that it flows therethrough in the same direction as that in the main energization mode, thereby resulting in a quick rise in the current flowing through the solenoid actuator and advance in time at which the valve starts to move in the main energization mode, which shortens the time until the start of movement of the valve and the time until the stroke of the valve is maximized to open or close a fluid path fully.

According to the third aspect of the invention, there is provided a solenoid-operated valve device which comprises: (a) a valve which is movable to open and close a fluid path selectively; (b) a solenoid actuator designed to be supplied with electric power from a battery to operate on voltage substantially identical with that outputted from the battery to move the valve; (c) an auxiliary coil connected to the solenoid actuator; and (d) a controller working to energize the solenoid actuator to move the valve. When it is required to move the valve, the controller supplies the electric power to the solenoid actuator through the auxiliary coil to step-up voltage to be applied initially to the solenoid actuator, thereby resulting in a quick rise in the current flowing through the solenoid actuator and advance in time at which the valve starts to move in the main energization mode, which shortens the time until the start of movement of the valve and the time until the stroke of the valve is maximized to open or close a fluid path fully.

According to the fourth aspect of the invention, there is provided a fuel injection system which comprise: (a) a common rail storing therein fuel at a controlled pressure; (b) a fuel injector working to spray the fuel, as stored in the common rail; (c) a valve which is movable to control pressure of the fuel in the common rail; (d) a solenoid actuator designed to be supplied with electric power from a battery to operate on voltage substantially identical with that outputted from the battery to move the valve; and (e) a controller working to energize the solenoid actuator in a selected one of a pre-energization mode and a main energization mode. In the pre-energization mode, the controller supplies an amount of the electric power to the solenoid actuator to energize the solenoid actuator to a degree which keeps the valve from moving. In the main energization mode, the controller supplies the electric power to the solenoid actuator to energize the solenoid actuator to a degree which moves the valve. The controller enters the pre-energization mode prior to the main energization mode, thereby resulting in an enhanced response speed at which the pressure of fuel in the common rail is controlled, thus minimizing the combustion noise, dilution of engine oil, or deterioration of exhaust emissions.

According to the fourth aspect of the invention, there is provided a fuel injection system which comprises: (a) a common rail storing therein fuel at a controlled pressure; (b) a fuel injector working to spray the fuel, as stored in the common rail; (c) a valve which is movable to control pressure of the fuel in the common rail; (d) a solenoid actuator designed to be supplied with electric power from a battery to operate on voltage substantially identical with that outputted from the battery to move the valve; and (e) a controller working to supply an amount of the electric power to the solenoid actuator to create a flow of a high current through the solenoid actuator to a degree which moves the valve in a main energization mode, the controller also working in a sub-energization mode to continue to supply an amount of the electric power to the solenoid actuator to create a flow of a low current through the solenoid actuator to a degree which keeps the valve from moving at least until initiation of the main energization mode. This results in a quick rise in the current flowing through the solenoid actuator and advance in time at which the valve starts to move in the main energization mode, thereby permitting the controller to control the pressure in the common rail at a desired time accurately.

According to the fifth aspect of the invention, there is provided a fuel injection system which comprises: (a) a common rail storing therein fuel at a controlled pressure; (b) a fuel injector working to spray the fuel, as stored in the common rail; (c) a valve which is movable to control pressure of the fuel in the common rail; (e) a solenoid actuator designed to be supplied with electric power from a battery to operate on voltage substantially identical with that outputted from the battery to move the valve; (f) an auxiliary coil connected to the solenoid actuator; and (g) a controller working to energize the solenoid actuator to move the valve, when it is required to move the valve, the controller supplying the electric power to the solenoid actuator through the auxiliary coil to step-up voltage to be applied initially to the solenoid actuator. This results in a quick rise in the current flowing through the solenoid actuator and advance in time at which the valve starts to move in the main energization mode, thereby permitting the controller to control the pressure in the common rail at a desired time accurately.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
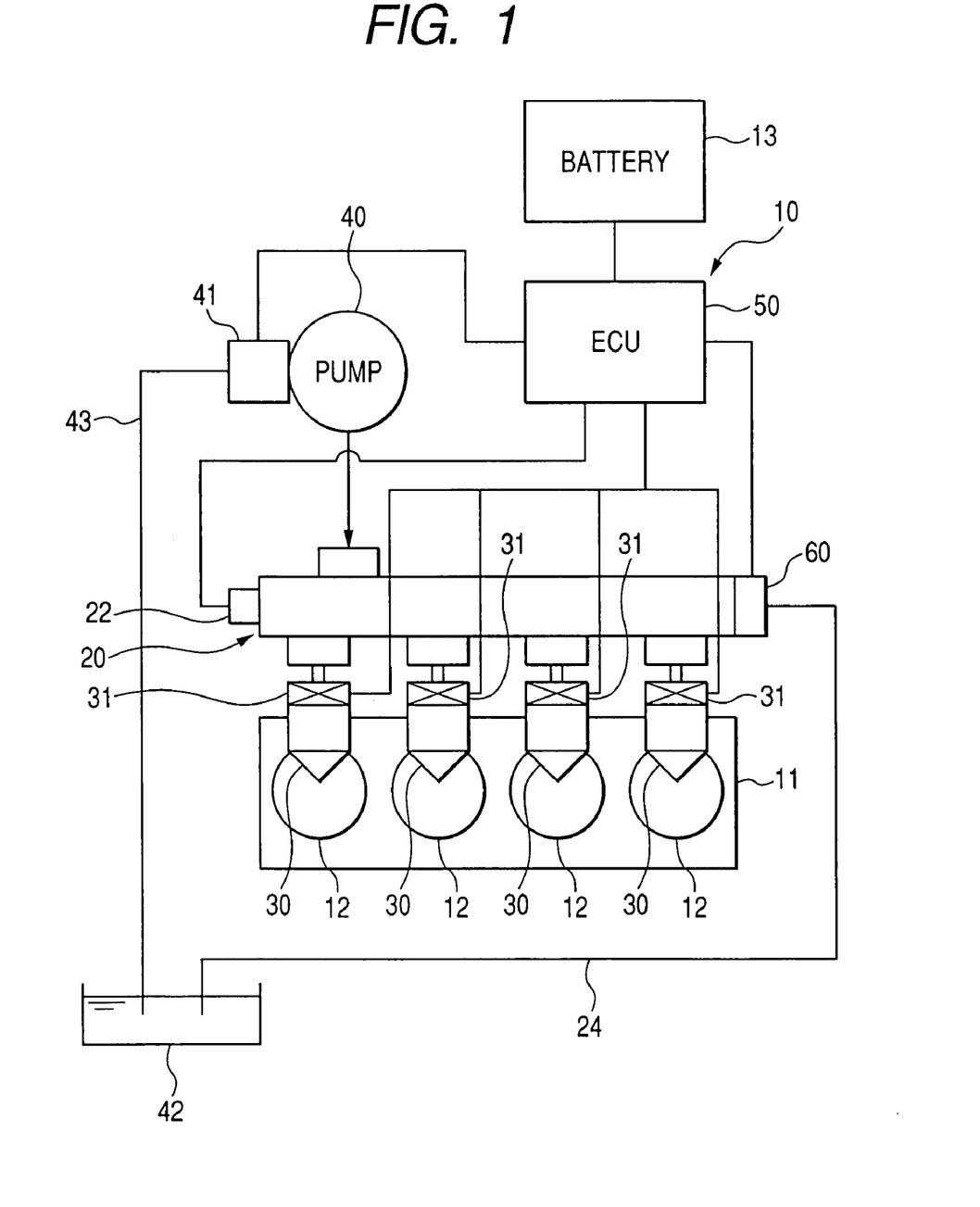
FIG. 1 is a block diagram which illustrates a fuel injection system equipped with a solenoid-operated valve device according to the first embodiment of the invention.

Referring to the drawings, wherein like reference numbers refer to like parts in several views, particularly to FIG. 1, there is shown a fuel injection system 10 for diesel engines according to the first embodiment of the invention.

Figure 2:
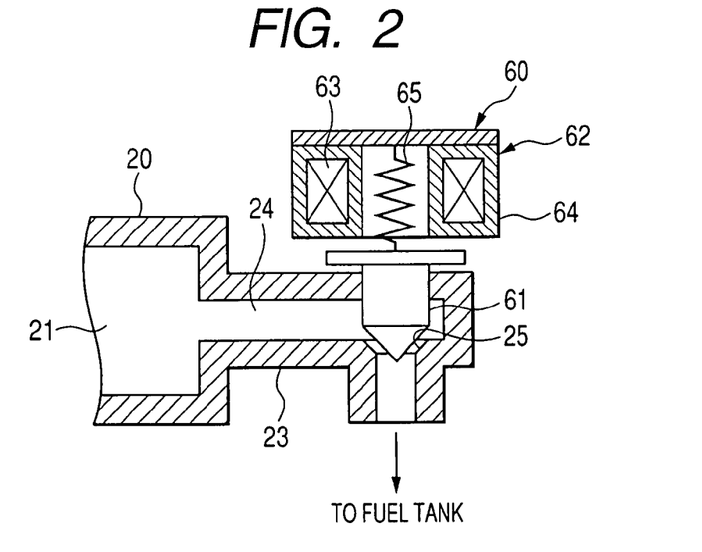
FIG. 2 is a partially sectional view which shows an internal structure of a pressure control valve.

The fuel injection system 10 works to inject fuel (i.e., light oil) into an diesel engine 11 and includes generally a common rail 20, injectors 30, a fuel injection pump 40, a flow rate control valve 41, and an electronic control unit (ECU) 50. The common rail 20 is made of a hollow cylinder and, as illustrated in FIG. 2, has an accumulator chamber 21 defined therein. The injectors 30 are, as clearly illustrated in FIG. 1, joined to the common rail 20. Each of the injectors 30 are joined to one of cylinders 12 of the diesel engine 11. Each of the injectors 30 is equipped with a solenoid valve 31 which is responsive to an electric signal from the ECU 50 to be opened or closed to spray the fuel into the cylinder 12 of the diesel engine 11 or stop the spray.

The fuel injection pump 40 works to suck the fuel from a fuel tank 42 and pressurize and feed it to the common rail 20. The common rail 20 stores therein the fuel fed from the fuel injection pump 40 and keep the pressure thereof as it is. The fuel injection pump 40 is equipped with the flow rate control valve 41 (also called a suction control valve) which controls the flow rate of fuel sucked from the fuel tank 42 into the fuel injection pump 40. The flow rate control valve 41 is responsive to a control signal from the ECU 50 to change a sectional area of a fuel path 43 extending from the fuel tank 42 to the fuel injection pump 40, thereby controlling the flow rate of fuel sucked into the fuel injection pump 40 to keep the pressure of fuel in the common rail 20 at a selected level.

The common rail 20 has a pressure sensor 22 and a pressure control valve 60 installed therein. The pressure sensor 22 works to measure the pressure of fuel in the common rail 20 (i.e., the accumulator chamber 21) to output an electric signal indicative thereof to the ECU 50 The pressure control valve 60 is opened in response to an open signal, as outputted from the ECU 50 when the pressure in the common rail 20 has exceeded a target value selected as a function of operating conditions of the diesel engine 11. When the pressure control valve 60 is opened, a portion of the fuel in the common rail 20 is returned back to the fuel tank 42 to decrease the pressure in the common rail 20.

The pressure control valve 60 serves as a solenoid-operated valve device along with the ECU 50. The pressure control valve 60 is, as illustrated in FIG. 2, equipped with a solenoid-operated actuator 62. The solenoid-operated device is controlled in operation by the ECU 50. The common rail 20 has formed at an end thereof an extension 23 which defines therein a drain path 24 from which an excess of the fuel is drained from the common rail 20. The drain path 24 connects between the accumulator chamber 21 and the fuel tank 42.

The pressure control valve 60 includes a valve member 61 (i.e., a needle) which is to be placed on a seat 25 formed on an inner wall of the extension 23 to close the drain path 24. When the valve member 61 is moved away from the seat 25, it opens the drain path 24. The solenoid-operated actuator 62 includes a coil 62, a stationary core 64, and a coil spring 65. The coil 63 is connected to the ECU 50 and supplied with electric power. The stationary core 64 covers the periphery of the coil 63 to form a magnetic circuit between itself and the valve member 61 when subjected to magnetic field, as produced by the coil 63. Specifically, when the coil 62 is excited, it will cause magnetic attraction to be produced between the stationary core 64 and the valve member 61, so that the valve member 61 is moved toward the stationary core 64. The spring 65 urges the valve member 61 toward the seat 25. When the coil 63 is deenergized, the valve member 61 is placed by the spring 65 in constant abutment with the seat 25.

The ECU 50 is implemented by a microcomputer made up of a CPU, a ROM, and a RAM. The ECU 50 works to execute computer-implemented programs, as stored in the ROM, to control the fuel injection system 10 and the diesel engine 11. The ECU 50, as can be seen from FIG. 1, works to establish or block the supply of electric power from a battery 13 to component parts of the fuel injection system 10 and is designed to supply a drive voltage substantially identical in level with the output voltage of the battery 13 to the pressure control valve 60.

When the ECU 50 energizes the coil 63, it will cause, as described above, the valve member 61 to be moved away from the seat 25 to open the drain path 24 to establish fluid communication between the common rail 20 and the fuel tank 42. Alternatively, when the ECU 50 deenergizes the coil 63, it will cause the valve member 61 is placed on the seat 25 to close the drain path 24 to block the fluid communication between the common rail 20 and the fuel tank 42.

The operation of the fuel injection system 10 equipped with the pressure control valve 60 will be described below.

The ECU 50 samples, for example, the speed and temperature of the diesel engine 11 and the position of an accelerator pedal (not shown) to determine operating conditions of the diesel engine 11. The ECU 50 determines a target quantity of fuel to be sprayed from the injectors 30 and a target pressure of fuel in the common rail 20 based on the operating conditions of the diesel engine 11 and outputs a control signal to the flow rate control valve 41 to control the flow rate of fuel to be supplied from the fuel injection pump 40 to the common rail 20 to bring the pressure in the common rail 20 into agreement with the target pressure.

The ECU 50 also samples an output from the pressure sensor 22 to determine an actual pressure of fuel in the common rail 20. The spraying of fuel from the injectors 30 will result in a drop in pressure of fuel in the common rail 20. The fuel injection pump 40 supplies the pressurized fuel to the common rail 20 cyclically, so that the pressure of fuel in the common rail 20 will continue to oscillate within a given range. For example, when the vehicle driver releases the accelerator pedal suddenly, the ECU 50 changes the target pressure of fuel in the common rail 20 to one corresponding to the position of the accelerator pedal and stops the spraying of fuel from the injectors 30 or decreases the target quantity of fuel to be sprayed from the injectors 30. This may cause the pressure in the common rail 20 not to drop down to the target level until a subsequent injection timing of fuel from the injectors 30. When the pressure in the common rail 20 is greatly above the target level, it will cause the fuel to be sprayed from the injectors 30 at excessive pressures, which leads to a drop in quality of the operating conditions of the diesel engine 11 such as an increase in the combustion noise, dilution of engine oil, or deterioration of exhaust emissions.

In order to alleviate the above problem, the ECU 50 works to open the pressure control valve 60 to drain the excess of the fuel from the common rail 20 to the fuel tank 42 when the pressure in the common rail 20, as measured by the pressure sensor 22, has exceeded the target level by a given value. The time lag in opening the pressure control valve 60 may cause the pressure in the common rail 20 to exceed an allowable upper limit. It is, thus, essential to return the fuel from the common rail 20 to the fuel tank 42 through the pressure control valve 60.

Figure 3:
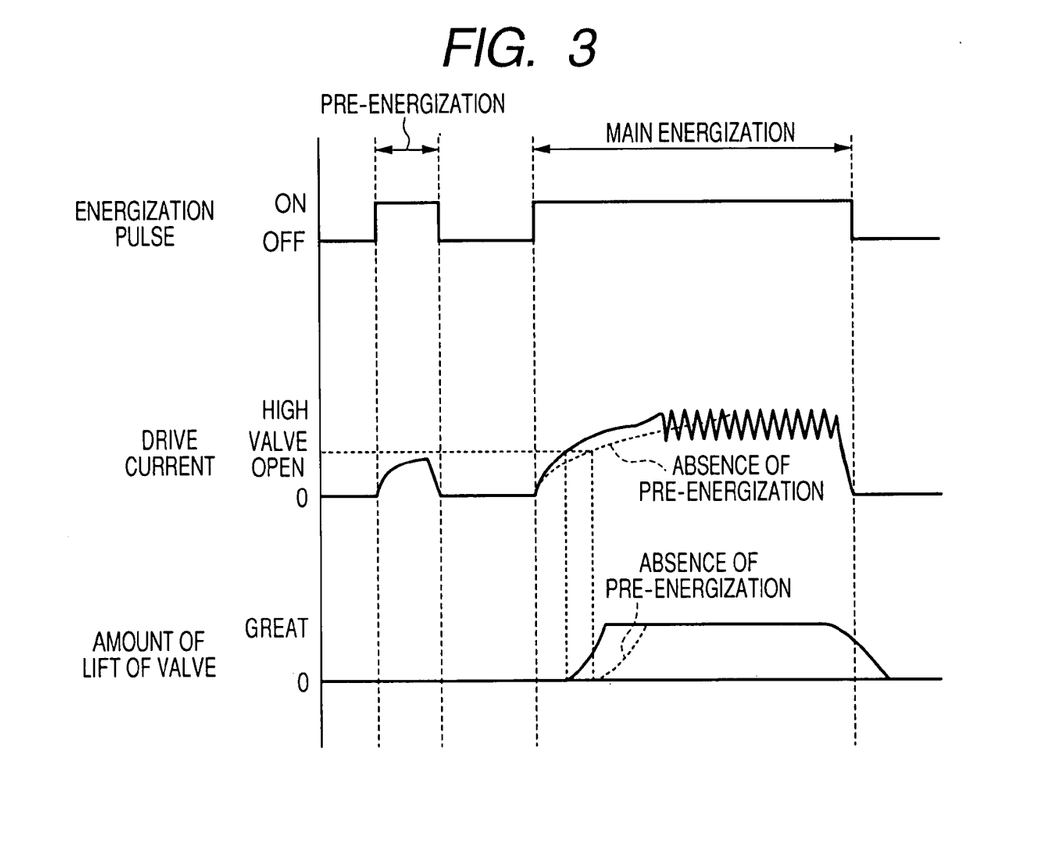
FIG. 3 is a view which shows a relation among a coil energization pulse, a drive current flowing through a coil of the pressure control valve of FIG. 2, and the amount of lift of a valve of the pressure control valve.

For the above purpose, the ECU 50 is designed, as illustrated in FIG. 3, to output a pre-energization pulse signal to an EDU (Electronic Driver Unit) not shown to shape the wave of electric current to be applied to the coil 63 to pre-energize the pressure control valve 60 prior to initiation of a main energization mode to open it. The pre-energization is to energize the pressure control valve 60 for a period of time shorter than that required by the coil 63 to produce the magnetic attraction to move the valve member 61. The spring 65 is designed to produce the elastic pressure which is great enough to bring the valve member 61 into contact with the seat 25 against an increased pressure of fuel in the common rail 20. The degree of the pre-energization of the coil 63 is selected to produce magnetic attraction through the magnetic circuit formed by the valve member 61 and the stationary core 64 embracing the coil 63 which is low enough not to attract the valve member 61 against the pressure exerted by the spring 65, that is, to place the valve member 61 on the seat 25 to keep the drain path 24 closed.

Specifically, the pre-energization of the coil 63 of the pressure control valve 60 develops the magnetic field at the coil 63 and forms the magnetic circuit to create through the stationary core 64 a flow of magnetic flux of the degree not moving the valve member 61. When the pre-energization is stopped, it will cause the coil 63 to be placed in a deenergized state, but the magnetic field, as developed by the coil 63, does not disappear immediately, so that the magnetic flux stays in the stationary core 64. When the coil 63 continues to be deenergized, the magnetic flux fades away. The coil 63, however, usually develops a counter-electromotive force oriented to obstruct the attenuation of the magnetic field. Specifically, the coil 63 produces the counter-electromotive force Vr, as given by an equation below, according to the Lenz's law. The direction of the flow of electric current, as produced by the counter-electromotive force, is identical with that of the flow of electric current through the coil 63 in the main energization mode to lift the valve member 61 away from the seat 25.

$$Vr = -N \times (\Delta B \cdot S)/\Delta t$$

where N is the number of turns of the coil 63, $\Delta B$ is an amount of change in the magnetic flux, and S is a sectional area of the coil 63 in which the magnetic field is developed.

The ECU 50 is designed to enter the main energization mode to output a main energization pulse signal to the EDU to energize the pressure control valve 60 fully in the presence of the counter-electromotive force after the stop of the pre-energization of the pressure control valve 60, that is, a falling edge of the pre-energization pulse signal. In the main energization mode, the ECU 50 continues to energize the coil 63 for a period of time long enough to produce the magnetic attraction between the stationary core 64 and the valve member 61 to lift up the valve member 61. This causes the valve member 61 to be moved away from the seat 25 against the pressure, as produced by the spring 65, to open the drain path 24, thereby draining the fuel from the common rail 20 to the fuel tank 42.

Figure 4A:
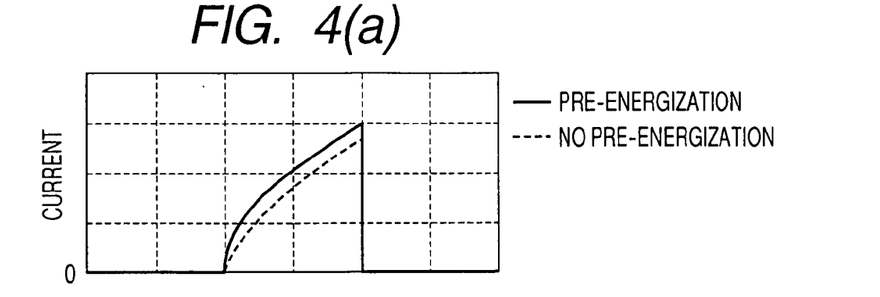
FIG. 4(a) is a graph which demonstrates rises in drive current flowing through a coil of a pressure control valve in the presence and absence of pre-energization of the coil, respectively.
Figure 4B:
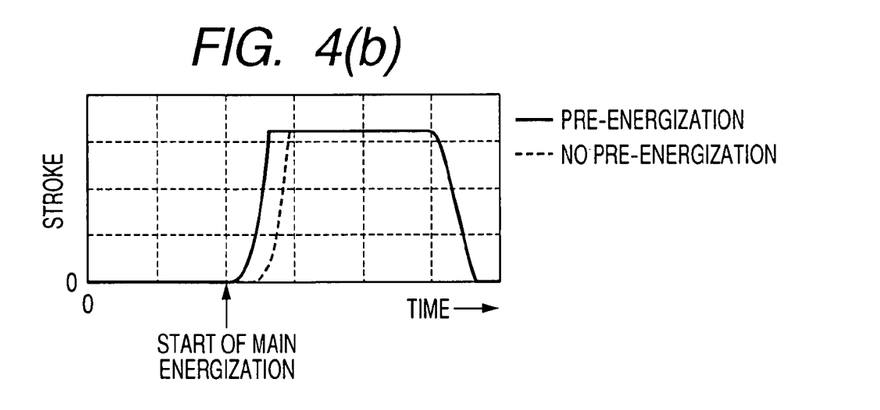
FIG. 4(b) is a graph which demonstrates rises in stroke of a valve member of a pressure control valve in the presence and absence of pre-energization of a coil of the pressure control valve.
Figure 5:
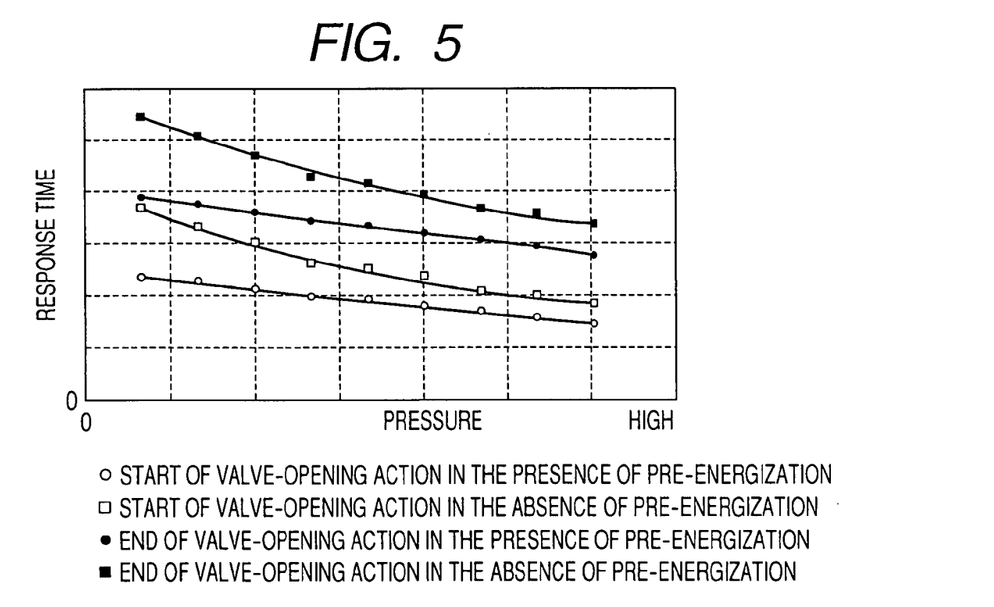
FIG. 5 is a graph which demonstrates relations between the pressure in a common rail and the response time of a valve member of a pressure control valve consumed until initiation and termination of opening and closing action of the valve member.

The ECU 50, as described above, enters the main energization mode before the counter-electromotive force disappears fully, thereby causing the current, as created by the counter-electromotive force, to assist in bringing the current flowing through the coil 63 in the main energization mode to a value quickly which is required to move or open the valve member 61. This, as illustrated in FIGS. 4(a) and 4(b), results in a quick rise in the current flowing through the coil 63 and advance in time at which the valve member 61 starts to move away from the seat 25 in the main energization mode as compared with the case where the pre-energization mode is not executed, thereby shortening, as can be seen from FIG. 5, the time until the start of movement of the valve member 61 and the time until the stroke of the valve member 61 is maximized to open the drain path 24 fully regardless of the pressure of fuel in the common rail 20. In other words, the pre-energization of the pressure control valve 60 results in a decrease in time lag between the start of the main energization of the coil 63 and the start of movement of the valve member 61 and an increase in speed at which the valve member 61 moves in the main energization mode.

For instance, when the pressure in the common rail 20, as measured by the pressure sensor 22, reaches a preselected value (e.g., 40 Mpa) which is lower than a target pressure (e.g., 50 Mpa) of the common rail 20, the ECU 50 enters the pre-energization mode and starts to output the pre-energization pulse signal, in sequence, at a given time interval The time interval between consecutive two of the pre-energization pulse signal is preferably selected to be the length of time the counter-electromotive force does not disappear fully. Subsequently, when the first condition (1) where the pressure in the common rail 20, as measured by the pressure sensor 22, has reached or exceeded the target pressure (e.g., 50 Mpa) or a threshold level which is selected to be greater than the target pressure by a given value, the second condition (2) where the counter-electromotive force, as produced by the stop of a last one of the pre-energization pulse signals, is still remaining in the coil 63, and a third condition (3) where the current time is between operations or fuel spraying events of the fuel injectors 30 are all met, the ECU 50 enters the main energization mode to output the main energization pulse signal to open the pressure control valve 60.

As described above, the ECU 50 is designed to enter the pre-energization mode to energize the coil 63 of the pressure control valve 60 for a given short time prior to the main energization mode to use the residual field to accelerate the rise in current flowing through the coil 63 upon initiation of the main energization mode. This results in quick opening of the pressure control valve 60 even using the output voltage of the battery 13 in energizing the coil 63, which leads to the improvement of response time for opening the valve member 61 of the pressure control valve 60 to control the pressure in the common rail 20 quickly.

The ECU 50 is, as described above, designed to drive the pressure control valve 60 using the output voltage of the battery 13, thereby eliminating the need for a driver circuit for the pressure control valve 60 which includes, for example, capacitors. This results in an enhanced response rate of the movement of the pressure control valve 60 without increasing the number of component parts and complexifying the structure of the fuel injection system 10.

The quick control of the pressure in the common rail 20 minimizes the spraying of an excessive quantity of fuel from the injectors 30, thus curbing the combustion noise, the dilution of engine oil, or the deterioration of exhaust emissions and improving the drivability of the diesel engine 11.

Figure 6:
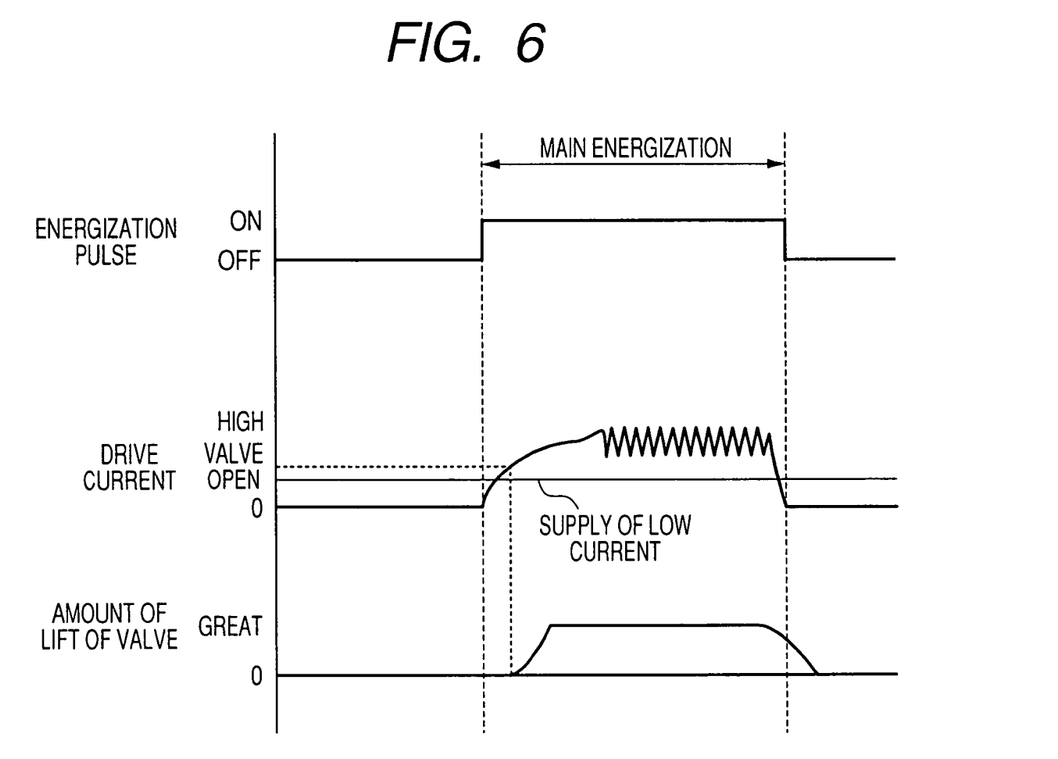
FIG. 6 is a view which shows a relation among a coil energization pulse, a drive current flowing through a coil of a pressure control valve, and the amount of lift of a valve of the pressure control valve in the second embodiment of the invention.

The fuel injection system 10 of the second embodiment will be described below with reference to FIG. 6 which is different from the first embodiment only in the manner to control the pressure control valve 60 through the ECU 50. Other arrangements are identical, and explanation thereof in detail will be omitted here.

The ECU 50 is designed to have a low-current supply circuit and enters a sub-energization mode upon turning on of the fuel injection system 10, immediately after start-up of the diesel engine, or when the pressure in the common rail 20, as measured by the pressure sensor 22, has reached a preselected value (e.g., 40 Mpa) which is lower than a target pressure (e.g., 50 Mpa) of the common rail 20. In the sub-energization mode, the ECU 50 starts and continues to supply a light or low current to the coil 63 of the pressure control valve 60. The ECU 50 selects the amount of the low current to be low, like in the pre-energization mode of the first embodiment, enough not to attract the valve member 61 against the pressure exerted by the spring 65. The lifting of the valve member 61 depends upon a physical balance among the pressure exerted by the spring 65 on the valve member 61, the magnetic attraction exerted by the energization of the coil 62 on the valve member 61, and the pressure of fuel in the common rail 20 acting on the valve member 61. The ECU 50 is, therefore, preferably designed to regulate the level of the low current as a function of the pressure in the common rail 20. Subsequently, when the first condition (1) where the pressure in the common rail 20, as measured by the pressure sensor 22, has reached or exceeded the target pressure (e.g., 50 Mpa) or a threshold level which is selected to be greater than the target pressure by a given value and the second condition (2) where the current time is between operations or fuel spraying events of the fuel injectors 30 are all met, the ECU 50 enters the main energization mode to output the main energization pulse signal to open the pressure control valve 60. The ECU 50 may be designed to continue, as illustrated in FIG. 6, to supply the low current to the coil 63 during the main energization mode or stop such supply upon entering the main energization mode.

As apparent from the above discussion, the ECU 50 of this embodiment works to output the main energization pulse signal to open the pressure control valve 60 while the low current is supplied to the coil 63 of the pressure control valve 60, thereby causing the low current to assist in bringing the current flowing through the coil 63 in the main energization mode quickly to the value which is required to move or open the valve member 61. This results, like the first embodiment, in a quick rise in the current flowing through the coil 63 and advance in time at which the valve member 61 starts to move away from the seat 25 in the main energization mode, thereby shortening the time until the start of movement of the valve member 61 and the time until the stroke of the valve member 61 is maximized to open the drain path 24 fully regardless of the pressure of fuel in the common rail 20. In other words, the use of the low current results in a decrease in time lag between the start of the main energization of the coil 63 and the start of movement of the valve member 61 and an increase in speed at which the valve member 61 moves in the main energization mode.

Figure 7:
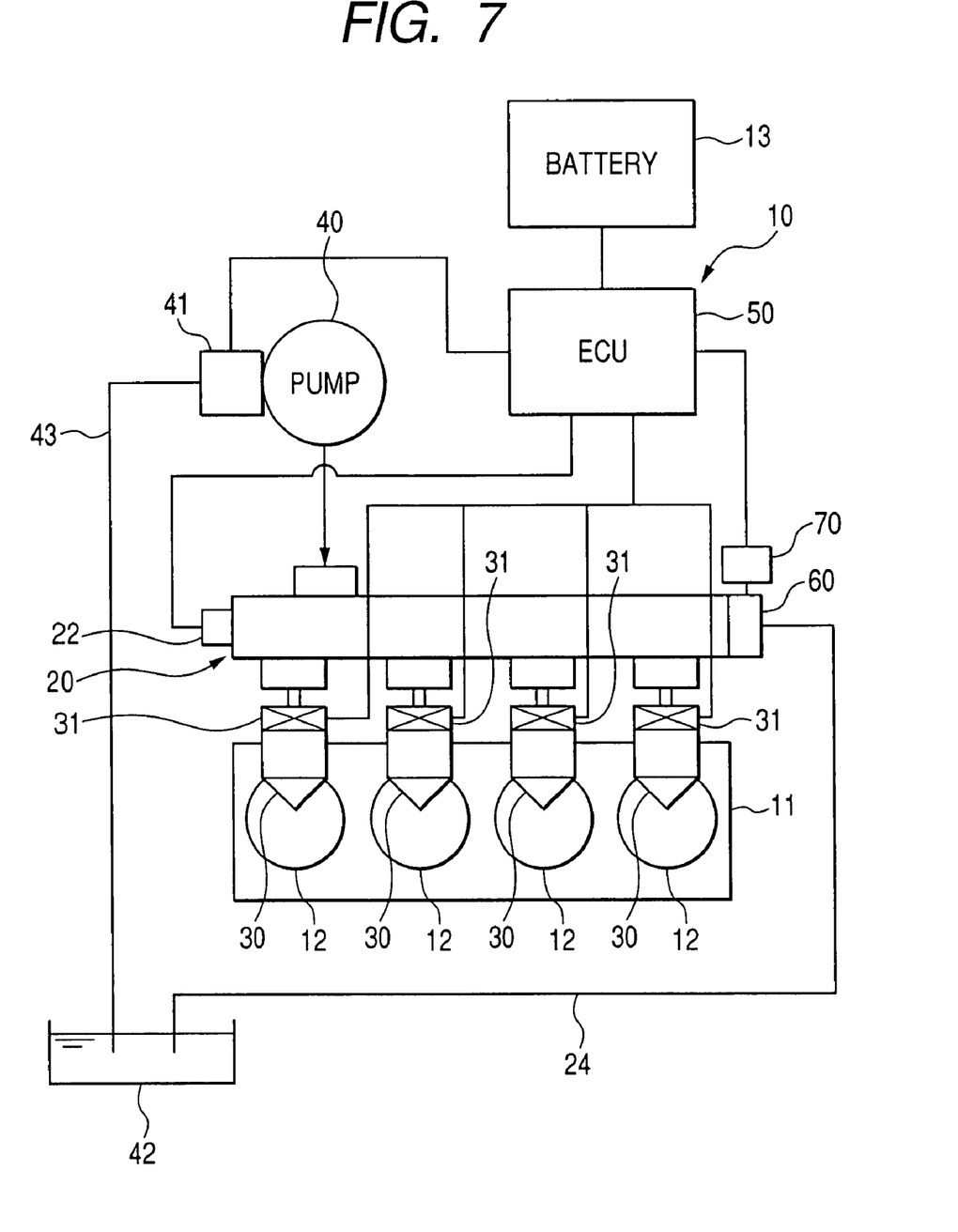
FIG. 7 is a block diagram which illustrates a fuel injection system equipped with a solenoid-operated valve device according to the third embodiment of the invention.

FIG. 7 illustrates the fuel injection system 10 for diesel engines according to the third embodiment of the invention.

The fuel injection system 10 includes an auxiliary coil 70 which works as a secondary coil to step up the voltage of power supplied from the battery 13 to the pressure control valve 60 temporarily.

When the pressure in the common rail 20, as measured by the pressure sensor 22, reaches a preselected value, the ECU 50 outputs a main energization pulse signal to open the pressure control valve 60. Specifically, the ECU 50 enters the main energization mode to energize the coil 63 of the pressure control valve 60 through the auxiliary coil 70, thereby causing the voltage to be applied to the coil 63 to rise temporarily to enhance a rise in current flowing through the coil 63. In other words, the current flowing out of the auxiliary coil 70 is used in assisting in energizing the coil 63 quickly, thereby resulting in a decrease in time lag between the start of the energization of the coil 63 and the start of movement of the valve member 61 and an increase in speed at which the valve member 61 moves away from the valve seat 25.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the solenoid-operated device in each of the first to third embodiments may be employed in controlling an opening operation of each of the injectors 30 to inject the fuel, as supplied from the common rail 20, into one of the cylinders of the diesel engine 11 in order to enhance the response time of the injectors 30.

The solenoid-operated valve device may also be employed in fuel injection systems for gasoline engines or valve control systems designed to electromagnetically control on-off operations of valves for decreasing the response time thereof without raising the complexity of the structure of the valves. For instance, the solenoid-operated valve device may be used for normally-open type solenoid valves designed to be energized to close a fluid path.

What is claimed is:

1. A solenoid-operated valve device comprising:
   a valve disposed to be movable;
   a solenoid actuator designed to be supplied with electric power from a battery to operate on voltage substantially identical with that outputted from the battery to move said valve; and
   a controller working to energize said solenoid actuator in a selected one of a pre-energization mode and a main energization mode, in the pre-energization mode, said controller supplying an amount of the electric power to said solenoid actuator to energize said solenoid actuator to a degree which keeps said valve from moving, in the main energization mode, said controller supplying the electric power to said solenoid actuator to energize said solenoid actuator to a degree which moves said valve, said controller entering the pre-energization mode prior to the main energization mode to enhance action of said solenoid actuator in the main energization mode.

2. A solenoid-operated valve device as set forth in claim 1, wherein said controller enters the main energization mode before a counter-electromotive force, as produced in said solenoid actuator by termination of the pre-energization mode to deenergize said solenoid actuator, disappears fully.

3. A solenoid-operated valve device comprising:
   a valve disposed to be movable;

a solenoid actuator designed to be supplied with electric power from a battery to operate on voltage substantially identical with that outputted from the battery to move said valve; and a controller working to supply an amount of the electric power to said solenoid actuator to create a flow of a high current through said solenoid actuator to a degree which moves said valve in a main energization mode, said controller also working in a sub-energization mode to continue to supply an amount of the electric power to said solenoid actuator to create a flow of a low current through said solenoid actuator to a degree which keeps said valve from moving at least until initiation of the main energization mode.

4. A solenoid-operated valve device comprising:

a valve which is movable to open and close a fluid path selectively;

a solenoid actuator designed to be supplied with electric power from a battery to operate on voltage substantially identical with that outputted from the battery to move said valve;

an auxiliary coil connected to said solenoid actuator; and a controller working to energize said solenoid actuator to move said valve, when it is required to move said valve, said controller supplying the electric power to said solenoid actuator through said auxiliary coil to step-up voltage to be applied initially to said solenoid actuator.

5. A fuel injection system comprising:

a common rail storing therein fuel at a controlled pressure;

a fuel injector working to spray the fuel, as stored in said common rail;

a valve which is movable to control pressure of the fuel in said common rail;

a solenoid actuator designed to be supplied with electric power from a battery to operate on voltage substantially identical with that outputted from the battery to move said valve; and a controller working to energize said solenoid actuator in a selected one of a pre-energization mode and a main energization mode, in the pre-energization mode, said controller supplying an amount of the electric power to said solenoid actuator to energize said solenoid actuator to a degree which keeps said valve from moving, in the main energization mode, said controller supplying the electric power to said solenoid actuator to energize said solenoid actuator to a degree which moves said valve, said controller entering the pre-energization mode prior to the main energization mode to enhance responsiveness of said solenoid actuator.

6. A solenoid-operated valve device as set forth in claim 5, wherein said controller enters the main energization mode before a counter-electromotive force, as produced in said solenoid actuator by termination of the pre-energization mode to deenergize said solenoid actuator, disappears fully.

7. A fuel injection system comprising:

a common rail storing therein fuel at a controlled pressure;

a fuel injector working to spray the fuel, as stored in said common rail;

a valve which is movable to control pressure of the fuel in said common rail;

a solenoid actuator designed to be supplied with electric power from a battery to operate on voltage substantially identical with that outputted from the battery to move said valve; and a controller working to supply an amount of the electric power to said solenoid actuator to create a flow of a high current through said solenoid actuator to a degree which moves said valve in a main energization mode, said controller also working in a sub-energization mode to continue to supply an amount of the electric power to said solenoid actuator to create a flow of a low current through said solenoid actuator to a degree which keeps said valve from moving at least until initiation of the main energization mode.

8. A fuel injection system comprising:

a common rail storing therein fuel at a controlled pressure;

a fuel injector working to spray the fuel, as stored in said common rail;

a valve which is movable to control pressure of the fuel in said common rail;

a solenoid actuator designed to be supplied with electric power from a battery to operate on voltage substantially identical with that outputted from the battery to move said valve;

an auxiliary coil connected to said solenoid actuator; and a controller working to energize said solenoid actuator to move said valve, when it is required to move said valve, said controller supplying the electric power to said solenoid actuator through said auxiliary coil to step-up voltage to be applied initially to said solenoid actuator.

* * * * *